Oct. 2, 1973

A. KHURI ET AL 3,763,303

RECOVERY OF MOLYBDENUM FROM SPENT CATALYST

Filed Dec. 13, 1971

INVENTORS.
Albert Khuri
Henry F. Barry
BY Calvin J. Hallada

Harness, Dickey & Pierce
ATTORNEYS.

United States Patent Office
3,763,303
Patented Oct. 2, 1973

3,763,303
RECOVERY OF MOLYBDENUM FROM
SPENT CATALYST
Albert Khuri, Henry F. Barry, and Calvin J. Hallada, Ann Arbor, Mich., assignors to American Metal Climax, Inc.
Filed Dec. 13, 1971, Ser. No. 207,305
Int. Cl. C01g 39/00
U.S. Cl. 423—54
16 Claims

ABSTRACT OF THE DISCLOSURE

A process for recovering molybdenum from organic residues of spent catalysts comprising subjecting the organic residue to a series of aqueous extractions effecting the removal of the predominant portion of molybdenum therefrom, followed by a recovery of the molybdenum from the aqueous extractant.

BACKGROUND OF THE INVENTION

In the chemical processing industry, organic solutions containing appreciable quantities of dissolved molybdenum are frequently formed as by-product streams which render it economically desirable to recover at least a portion of the valuable molybdenum constituent therein. Typical of such organic solutions containing molybdenum is the spent catalyst or concentrates of spent catalysts derived from the epoxidation of olefinically unsaturated compounds employing organic hydroperoxides as the oxidizing agent. An epoxidation process of the foregoing type is described in Belgian Pat. No. 647,076, dated June 20, 1966. A method of preparing an organic solution of a molybdenum catalyst suitable for use in such epoxidation processes is described in U.S. Pat. No. 3,453,218, granted July 1, 1969.

A number of recovery processes have been tried in recognition of the fact that the successful recovery of molybdenum from the organic spent catalyst streams constitutes an important factor in the overall economics of such processes. Such prior art recovery techniques have not been entirely satisfactory because of the relatively expensive and/or large quantities of chemical reagents required in effecting a recovery of the molybdenum constituent or, alternatively, because of the relatively elaborate and costly processing equipment required to process such spent catalyst streams. The present invention overcomes the problems and disadvantages present in such prior art recovery techniques by providing a simple, efficient and economical method for effecting a substantially complete extraction and recovery of the valuable molybdenum constituents from organic residues and particularly, from spent catalyst streams.

SUMMARY OF THE INVENTION

The foregoing and other advantages and benefits are achieved in accordance with a recovery process comprising one embodiment of the present invention in which an organic solution of a spent molybdenum catalyst is adjusted, if necessary, to a controlled dilute concentration of molybdenum of about 0.2% to about 0.8% and thereafter is subjected to a plurality of extractions at controlled volumetric ratios using an aqueous extractant which preferably comprises water, but may contain aqueous soluble reagents such as acids and basis, if desired. The aqueous extractant is subsequently treated to effect a recovery of the molybdenum therefrom such as by precipitation or by heating to effect an evaporation of the water therefrom, leaving a non-volatile residue. The residue is subjected to calcination at an elevated temperature, forming a solid residue containing molybdenum oxide which is recovered and further processed as may be desired in accordance with well known techniques. In accordance with the preferred practice of the foregoing embodiment, the aqueous extractant employed is comprised essentially of water and is utilized for performing three separate extraction cycles at volumetric ratios of organic solvent to aqueous extractant of about 4:1, 10:1 and 20:1, respectively, achieving an extraction of at leeast about 90% of the molybdenum content in said solvent. Further efficiency in the practice of the process is achieved by utilizing the extracted solvent phase as a supplemental fuel for the evaporation step during which the aqueous extractant phase is heated to a temperature usually ranging from about 100° C. to about 120° C.

In accordance with a second embodiment of the present invention, the organic residues derived from spent catalyst streams are concentrated by the evaporation of a portion of the volatile organic solvent to produce viscous liquids usually containing about 2% to about 4% molybdenum, or waxy-type semi-solid or solid residues usually containing about 4% to about 7% molybdenum, as well as substantially solvent-free residues containing up to about 13% molybdenum. Such concentrated residues are extracted preferably at reflux temperature employing aqueous extractants containing alkaline reagents including potassium hydroxide, sodium hydroxide, ammonium hydroxide, and mixtures thereof, or acid reagents including nitric acid, phosphoric acid, hydrochloric acid, sulfuric acid, and mixtures thereeof, at extractant to catalyst residue ratios of from about 2:1 up to about 20:1, and preferably, at about 5:1 up to about 15:1. The specific number of extraction cycles required in order to recover substantially all of the molybdenum value in the organic residue will vary from one up to about four depending on the type and concentration of the reagent used, the temperature at which the extraction is performed, the ratio of aqueous extractant to organic residue and the extraction contact time.

Additional benefits and advantages of the present invention will become apparent upon a reading of the description of the preferred embodiments taken in conjunction with the accompanying drawing.

DESCRIPTION OF THE PREFERRED EMBODIMENTS

Figure 1:
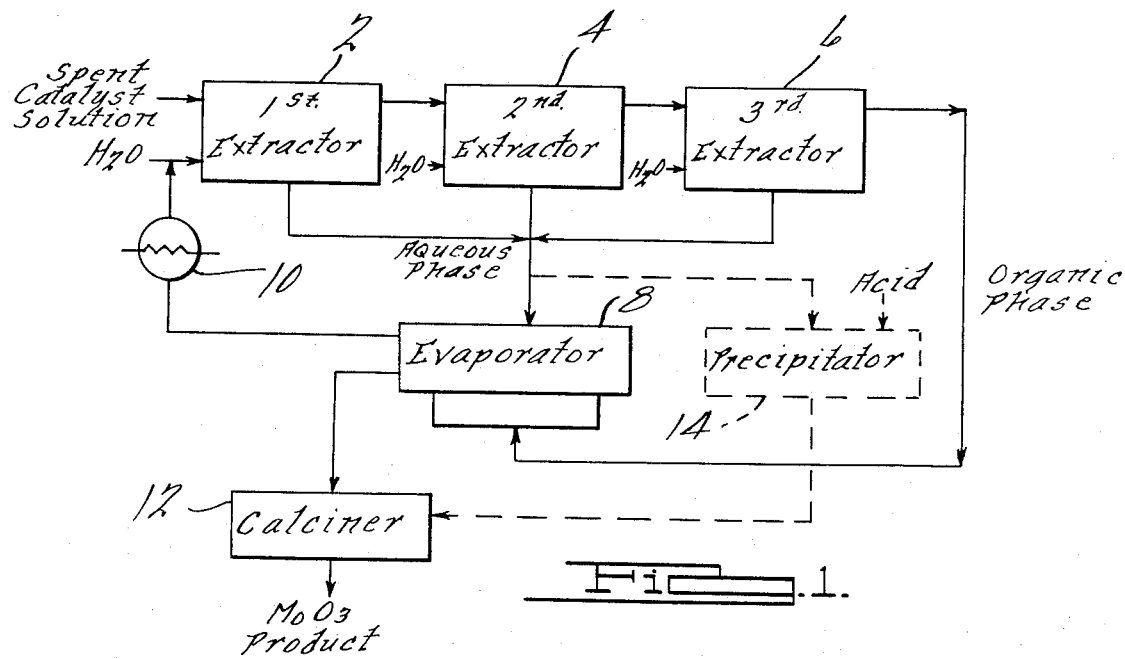
FIG. 1 comprises a schematic flow diagram illustrating the processing steps for effecting extraction of molybdenum values from dilute organic solutions of spent catalyst in accordance with one embodiment of the present invention.

While the process comprising the present invention is suitable for recovering molybdenum contained in various organic residues, the method is particularly effective for simply and economically recovering molybdenum from organic solutions of spent catalysts derived from the epoxidation of olefinically unsaturated hydrocarbons. As previously indicated, a typical method for preparing such molybdenum containing epoxidation catalysts is described in U.S. Pat. No. 3,453,218. In the preparation of the catalyst as described, metallic molybdenum is reacted with a combination of formic acid and tertiary butyl hydroperoxide at atmospheric pressure and at a temperature ranging from about 10° C. to about 50° C. During the reaction, sufficient tertiary butyl hydroperoxide is present to maintain an oxidizing condition. Normally, a mol ratio of tertiary butyl hydroperoxide to molybdenum of about 2:1 is sufficient, although a slight excess is usually preferred. Similarly, formic acid is employed at a ratio of about 2 mols per mol of molybdenum metal in order to achieve good yields of the molybdenum catalyst solution.

The resulting organic catalyst solution is employed to catalyze the liquid phase epoxidation reaction in the olefin-hydroperoxide mixture. At the conclusion of the epoxidation reaction, the spent organic catalyst solution is separated and generally comprises dissolved molybdenum in combination with tertiary butyl alcohol, high molecular weight organic compounds including polyhydric alcohols and esters, and trace quantities of organic peroxide compounds. Such spent catalyst streams usually contain about 0.6% molybdenum and can be processed directly in accordance with one embodiment of the present invention. It is also contemplated in accordance with an alternative practice of the present invention that the distillate bottoms fraction from the reaction mixture comprising the spent catalyst can be further concentrated by removing a portion of the volatile organic solvent therefrom. Typically, such concentrated spent catalyst solutions are of a relatively viscous consistency and of a dark brown color and contain from about 2% to about 4% molybdenum. Further concentration by removal of volatile solvent produces a dark brown solid or semi-solid typically containing about 4% to about 7% molybdenum.

The recovery of molybdenum from the spent organic catalyst solution is achieved in accordance with one practice of the present invention by a liquid-to-liquid extraction utilizing an aqueous extractant consisting essentially of water which is intermittently admixed with the organic solution to effect an extraction and transfer of at least a portion of the molybdenum constituent from the organic phase to the aqueous phase. Spent organic catalyst solutions derived directly from epoxidation reactions without further treatment usually contain molybdenum in concentrations of from about 0.2% to about 0.8% by weight which has been found particularly satisfactory for the liquid-to-liquid extraction process in which the aqueous extractant consists essentially of water. Spent organic catalyst solutions containing less than about 0.2% molybdenum are preferably concentrated such as by distilling off a portion of the volatile organic solvent so as to increase the molybdenum concentration to within the range of about 0.2% to about 0.8%. Alternatively, when pretreated concentrates of spent organic catalyst residues are to be subjected to a liquid-to-liquid extraction, such concentrated residues are first diluted with organic solvent derived from the concentration or extraction of prior spent catalyst solutions so as to adjust the molybdenum concentration within the aforementioned processing range of about 0.2% to about 0.8%. The concentration of such spent catalyst solutions to viscous liquids usually containing about 2% to about 4% molybdenum or to waxy-like solids or semi-solids containing from about 4% to about 7% molybdenum is usually desirable when such catalyst residues are shipped to remote places for recovery, thereby substantially reducing the bulk of material shipped.

The dilution and adjustment of viscous liquid concentrates of spent catalyst solutions can readily be achieved by direct addition of organic solvent with agitation. In the case of wax-like solids and semi-solids, a comminution of such catalyst residues to expose increased surface area is usually desirable to accelerate the rate of dissolution of the material to form a dilute solution satisfactory for liquid-to-liquid extraction. In some instances, it has been found that substantially dry, black solid powder concentrates of such spent organic catalyst solutions which have been concentrated by heating to elevated temperatures over prolonged time periods and which contain upwards of about 10% and usually about 13% by weight molybdenum are, in many instances, insoluble in the organic solvent or at least are sparingly soluble or difficult to dissolve, necessitating treatment for recovery of the valuable molybdenum constituent in accordance with the alternative embodiment of the present invention. In any event, the spent organic catalyst solution, either as directly received from the epoxidation process or as prepared by the addition or removal of controlled amounts of organic solvent therefrom to produce the desired molybdenum concentration, is subjected to liquid-to-liquid extraction employing water as the aqueous extractant.

The liquid-to-liquid extraction can be performed batchwise employing a series of independent extraction cycles in which the volumetric ratio of organic solution to water extractant is carefully controlled to provide for an optimum concentration of molybdenum in the final aqueous extractant. Alternatively, the extraction can be carried out by employing a countercurrent extraction operation in which the organic spent catalyst solution and aqueous extractant are caused to flow past or through one another in opposite directions in a manner to effect intimate contact therebetween so as to effect a removal of the predominant portion of molybdenum content in the organic solution.

When performing the extraction on a batchwise basis, it has been found that for most organic solutions, the initial extraction is limited to a volumetric ratio of organic solution to aqueous extractant of about 4:1 since higher ratios result in a single phase mixture or an emulsion which requires excessive time to separate into two distinct phases. In view of economic and practical considerations, it is preferred to effect an extraction of the molybdenum in a manner such that the concentration thereof in the aqueous extractant is at a maximum. Accordingly, it is desirable in each successive liquid-to-liquid extraction cycle to employ the highest volumetric ratio of spent organic catalyst solution to aqueous extractant as is practically possible without producing a single phase mixture or one that requires excessive time to separate into two distinct phases.

In consideration of the foregoing parameters, particularly satisfactory results are obtained with organic spent catalyst solutions derived from epoxidation reactions containing about 0.2% to about 0.8% by weight molybdenum in which organic to aqueous volumetric extraction ratios of about 4:1 are used in the first extraction cycle; ratios of about 10:1 in the second extraction cycle; and volumetric liquid-to-liquid extraction ratios of about 20:1 in the third extraction cycle. By employing the foregoing ratios, an extraction of between about 60% to 70% of the molybdenum content in the organic spent catalyst solution is effected during the first extraction cycle; a cumulative extraction of between about 70% and 90% is effected at the conclusion of the second extraction cycle and a cumulative extraction of from about 80% up to about 95% is achieved at the completion of the third extraction cycle. Still further successive extractions can be employed to remove the remaining 5% or 10% of the molybdenum in the organic spent catalyst solution if desired. Generally, three successive extraction cycles or an equivalent continuous countercurrent extraction in which between about 90% to 95% of the molybdenum content is transferred to the aqueous extractant has been found to provide satisfactory performance from a processing as well as economic standpoint. While lower volumetric ratios of organic solution to aqueous extractant can be employed, such as ratios of 1:1 or even less during the first as well as successive extraction cycles, the use of such lower ratios results in a substantial increase in the quantity of aqueous extractant produced and a corresponding reduction in the concentration of molybdenum contained therein. The increased volume of liquid extractant necessitates a corresponding increase in the quantity of heat required to effect an evaporation of the water to produce a nonvolatile residue or, alternatively, increased difficulty in effecting a recovery of the dissolved molybdenum by chemical reagents to effect a precipitation or extraction of the molybdenum content therefrom. In view of the foregoing, it is usually preferred to employ the highest volumetric ratio of organic spent catalyst solution to aqueous extractant which is practically feasible, thereby further enhancing the economics of the process. The use of such optimum ratios also minimizes an extraction of organic constituents in the aqueous phase and vice versa.

Referring now to the drawing, FIG. 1 comprises a flow diagram illustrating the transfer of organic spent catalyst solutions through the several processing units to effect an extraction and recovery of the valuable molybdenum constituent therefrom in accordance with a preferred practice of one embodiment of the present invention. The organic spent catalyst solution and water are introduced into a first extractor, indicated at 2, in which an intimate mixture of the two materials is effected, followed by a phase separation comprising an organic layer and an aqueous extractant layer. The organic layer is withdrawn from the first extractor 2 and is successively transferred to the second extractor 4 and then third extractor 6 in which the organic solution to aqueous extractant volumetric ratios are progressively increased. In accordance with the preferred practice as previously described, volumetric extraction ratios of organic solution to aqueous extractant of 4:1, 10:1 and 20:1 are maintained in the first, second and third extractor, respectively. The aqueous extractant layer withdrawn from each extractor is combined and transferred to an evaporator 8 in which the aqueous extractant is heated at a temperature usually ranging from about 100° C. to about 120° C. to effect an evaporation of the water constituent therein. The water and any organic vapors removed are transferred to a condenser 10 and the condensate therefrom is added to the water pumped into the extractor 2.

As shown in the flow diagram, the organic layer can be conveniently used as a supplemental fuel for heating the aqueous extractant in the evaporator, thereby further enhancing the economics of the recovery operation. Since as previously indicated some water becomes dissolved in the organic solution during the liquid-to-liquid extraction operation, the actual flammability of the organic solution will vary depending upon the specific hydrocarbon composition thereof as well as the residual water content contained therein. In typical spent organic catalyst solutions, volumetric ratios of organic solution of water of about 8:1 or above have been found to be flammable, whereas ratios less than the foregoing are generally non-flammable, but can be satisfactorily employed as a supplemental fuel in conjunction with a conventional fuel.

The aqueous extractant upon completion of the evaporation cycle produces a substantially non-volatile residue which thereafter is preferably transferred to a calcination unit indicated at 12 in which it is heated to an elevated temperature in air so as to effect a decomposition of the molybdenum constituent which is subsequently recovered as molybdenum trioxide product.

The excellent efficiency of the process depicted in FIG. 1 providing for a recovery of about 90% to about 95% of the molybdenum content in organic spent catalyst solutions utilizing water as the aqueous extractant ordinarily does not justify, from an economic standpoint, the use of supplemental reagents in admixture with the aqueous extractant. It has been found, however, that the use of aqueous solutions usually containing from about 10% to about 30% ammonium hydroxide can be satisfactorily employed for the purpose of enabling a recovery of the molybdenum constituent from the aqueous extractant by precipitation rather than evaporation. This alternative recovery step is illustrated in dotted lines in FIG. 1. By utilizing ammonium hydroxide in the aqueous extractant, the molybdenum value in the organic spent catalyst solution is converted to ammonium compounds and/or ammonium complexes which, upon consolidation, is transferred to a precipitator indicated at 14 in FIG. 1, to which acid is added to effect a reduction in the pH to a level at which precipitation of ammonium molybdate occurs. Ordinarily sufficient acid is added to effect a pH reduction to a level of at least about 2 and, preferably, of about 1.5 or less. In this regard, while various mineral acids can be employed, including hydrochloric acid and sulfuric acid, nitric acid constitutes the preferred material because of the purity of the resultant calcined product. As shown in FIG. 1, the solid precipitate derived from the precipitator 14 by settling or filtration comprising the recovered molybdenum values is transferred to the calciner and is heated in a manner as previously described in connection with the solids derived from the evaporator 8 to produce a molybdenum trioxide product.

A typical batchwise three-step liquid-to-liquid extraction is performed on a laboratory basis utilizing a spent organic catalyst solution containing about 0.6% molybdenum and employing water as the aqueous extractant. A weight balance and input of the streams to the various extraction phases, culminating in the aqueous extractant adapted to be charged to the evaporator, is set forth in the following table:

TABLE 1

| | Weight balance, parts by weight | | |
|---|---|---|---|
| | Organic phase | Aqueous phase | Molybdenum |
| First extractor: | | | |
| Mixture | 99.40 | 25.00 | 0.60 |
| Aqueous phase | | 15.00 | 0.43 |
| Organic phase | 109.40 | | 0.17 |
| Second extractor: | | | |
| Mixture | 109.40 | 10.00 | 0.17 |
| Aqueous phase | | 20.00 | 0.10 |
| Organic phase | 99.40 | | 0.07 |
| Third extractor: | | | |
| Mixture | 99.40 | 5.00 | 0.07 |
| Aqueous phase | | 10.00 | 0.03 |
| Organic phase | 94.40 | | 0.04 |
| Aqueous solution to crystallizer | | 45.00 | 0.56 |

As will be apparent from the foregoing data, 0.56 gram of the molybdenum constituent in the original organic spent catalyst solution was extracted representing a recovery of about 93%. The 5 parts by weight increase in the quantity of aqueous extractant over the 40 parts by weight added during the three extraction steps is attributable to the 5 parts by weight of organic solvent which was concurrently extracted and dissolved therein with a corresponding reduction in weight of the organic phase removed from the third extraction step.

In accordance with a second embodiment of the present invention, an extraction of molybdenum values from organic catalyst residues which have been concentrated by the removal of at least a portion of the solvent therefrom is achieved employing an aqueous extractant containing alkaline or acidic reagents therein. Organic molybdenum containing catalyst residues adaptable for processing in accordance with the second embodiment include concentrated relatively viscous dark-brown liquids containing from about 2% to about 4% molybdenum, wax-like solid and semi-solid residues of a dark-brown color usually containing from about 4% to about 7% molybdenum, as well as black powdery residues usually containing upwards of 10% molybdenum. Aqueous reagents which have been found satisfactory for multiple extraction of the molybdenum values from such concentrated organic catalyst residues include aqueous solutions containing potassium hydroxide in amounts of from about 2% to about 10%; aqueous solutions of sodium hydroxide in concentrations of about 2% to about 10% by weight; aqueous solutions containing ammonium hydroxide in concentrations of about 10% up to concentrated solutions of about 30% by weight; aqueous acidic solutions including concentrated nitric acid solutions of about 95% by weight; aqueous solutions containing from about 10% to about 75% phosphoric acid; concentrated hydrochloric acid solutions, and the like. Of the foregoing, the use of aqueous ammonium hydroxide solutions as the extractant reagent constitutes a preferred practice in that the molybdenum product recovered may be in the form of ammonium molybdenum compounds or may be calcined in air to molybdenum oxide products without the presence of any contaminating metal such as potassium and sodium introduced as part of the reagents used.

Figure 2:
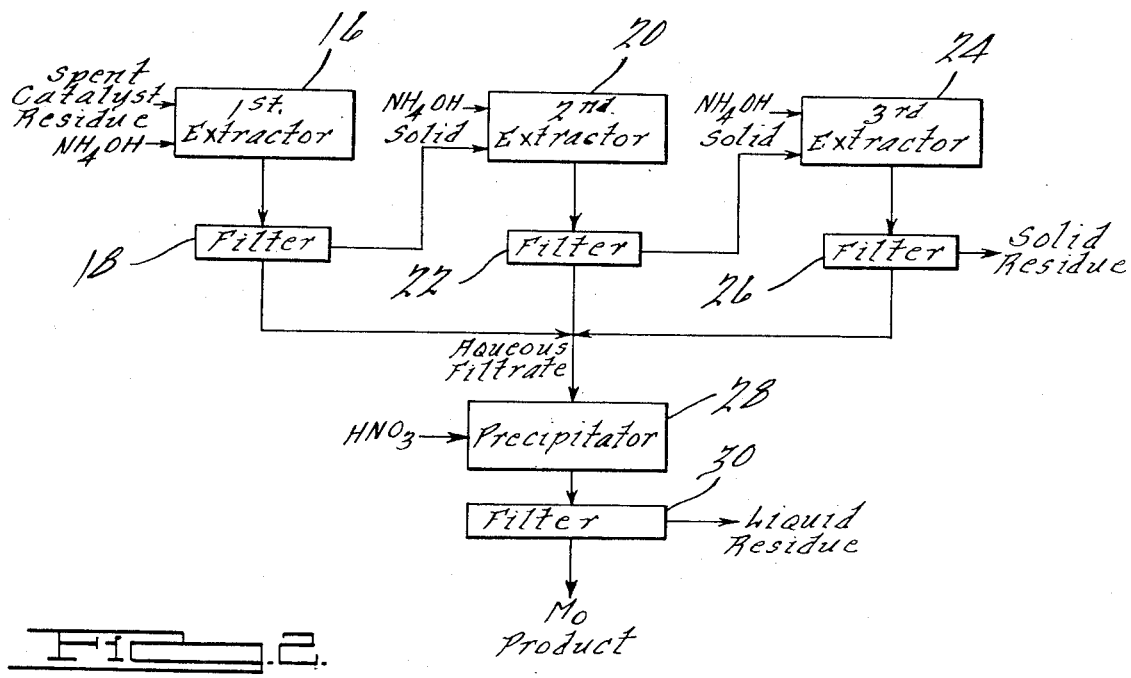
FIG. 2 is a schematic flow diagram illustrating the processing steps of effecting an extraction of the molybdenum values from solid organic residues employing an aqueous extractant incorporating alkaline or acidic reagents therein in accordance with a second embodiment of the present invention.

Referring now to FIG. 2 of the drawings, a diagrammatic flow sheet of a three-phase batch extraction of a concentrated organic spent catalyst residue in the form of a solid black powder containing about 13% by weight is illustrated utilizing concentrated ammonium hydroxide as the aqueous extractant in each extraction phase. The solid spent catalyst residue and concentrated (29%–30%) ammonium hydroxide aqueous extractant are introduced into the first extractor indicated at 16 and intimately admixed. The resultant mixture, after reaction, is transferred to a filter 18 and the solid material recovered is transferred to a second extractor 20 in which additional ammonium hydroxide solution is added to effect further extraction of the molybdenum values therefrom. The resultant slurry is transferred to a filter 22 and the solid material recovered is transferred to a third extractor 24 in which ammonium hydroxide extractant is added to effect a final extraction step. The resultant slurry is transferred to filter 26 and the solid material recovered therefrom is transferred to waste.

The filtrate from filters 18, 22 and 26 are combined and transferred to a precipitator 28 to which acid, preferably nitric acid, is added to effect a reduction of the pH thereof as in the case of the precipitator 14 of FIG. 1 to produce a substantially complete precipitation of the ammonium molybdenum compounds contained therein. The slurry from the precipitator 28 is transferred to a filter 30 and the molybdenum product in the form of a solid is recovered therefrom and the liquid residue, after further treatment, is discharged to waste. The resultant molybenum-containing solid recovered from the filter 30 can be used "as is," that is, as an ammounium molybdate, or subjected to further calcination, as in the calciner 12 of FIG. 1, to produce a molybdenum trioxide product, as may be desired.

In performing such extraction, particularly in the case of semi-solid and solid spent catalyst residues, the ratio of liquid extractant to solid residue is controlled on a weight basis from about 2:1 up to about 20:1, and preferably from about 5:1 to about 15:1 parts aqueous extractant to per part catalyst residue.

A weight balance of a three-step extraction of a solid black powdery spent catalyst residue containing about 13% by weight molybdenum is illustrated in the following table which is conducted in accordance with the arrangement schematically illustrated in FIG. 2:

TABLE 2

| | Weight balance, parts by weight | | |
|---|---|---|---|
| | Solid residue | Liquid residue | Molybdenum |
| Starting mixture | 100.0 | 500.0 | 13.0 |
| First extractor: | | | |
| Solid | 86.4 | | 8.4 |
| Filtrate | | 513.6 | 4.6 |
| Second extractor: | | | |
| Solid | 74.0 | | 2.9 |
| Filtrate | | 512.4 | 5.5 |
| Third extractor: | | | |
| Solid | 70.0 | | 2.2 |
| Filtrate | | 504.0 | 0.7 |
| Solution to precipitator | | 1530.0 | 10.8 |
| Liquid residue | | 1514.6 | 1.5 |
| Molybdenum product | 15.4 | | 9.3 |

It will be apparent that 9.3 parts by weight of the original 13 parts by weight of the molybdenum value was recovered in the product from the filter representing about a 71% recovery. Still further increases in the percent of molybdenum recovered can be achieved by subjecting the solid residue remaining from the third extraction cycle to a fourth and additional extractions or a recombination or recycling thereof with fresh concentrated spent catalyst residue charged to the first extraction step as may be desired.

In order to further illustrate the process comprising the present invention, the following examples are provided. It will be understood that the examples are merely illustrative and are not intended as being restrictive of the process as herein disclosed and as defined in the subjoined claims.

EXAMPLE 1

An organic spent catalyst solution of the composition as set forth in the foregoing table was subjected to three successive aqueous extraction cycles employing water as the extractant at volumetic ratios of organic solution to aqueous extractant of 4:1, 10:1 and 20:1, respectively. The aqueous extractant from each extraction cycle was consolidated and was found to contain 0.53% molybdenum and 0.22% iron. The solution was of a light brown color and the molybdenum content thereof represented about 92% by weight of molybdenum originally present in the organic catalyst solution.

The resultant consolidated aqueous extractant was heated for a period of one hour between 100° C. to 120° C. in an evaporator, whereby a crystalline dark brown solid was produced containing 23.3% molybdenum and 9.6% iron on a weight basis. The dark brown crystalline solid was transferred to a calcination unit and heated for a period of 15 hours at a temperature of 575° C., whereby a reddish-yellow solid was produced. This solid contained 47.4% by weight molybdenum (equivalent to 72% $MoO_3$) and 19.9% by weight iron (equivalent to 27% $Fe_2O_3$).

In the foregoing example, the consolidated aqueous extractant comprised 121 parts by weight which produced 2.7 parts by weight of the non-volatile, dark brown crystalline solid at the completion of the evaporation step. The reddish-yellow solid produced at the conclusion of the calcination step comprised 0.78 parts by weight and consisted essentially of a mixture of molybdenum oxide and iron oxides.

EXAMPLE 2

An 80.5 grams organic catalyst solution, which contained 2.1 grams of molybdenum (2.6% by weight) was stripped of solvent by application of heat to simulate a concentrated solid spent catalyst residue. The solvent boiled in the range of 80 to 180° C. The quantity of liquid solvent removed was 31 grams or 40% by weight of the original solution.

A portion of the remaining solid was treated with a 2% aqueous solution of sodilm hydroxide at approximately 100° C. for two hours. The ratio of weight of aqueous extractant to weight of solid was about 10:1. The amount of molybdenum recovered as a result of the extraction was 55%.

EXAMPLE 3

A 5 gram spent catalyst sample in the form of a waxy-solid which contained 6.3% by weight molybdenum was treated with 29% aqueous ammonium hydroxide. The weight ratio of aqueous extractant to spent catalyst was 10:1. After one extraction, 32% of the contained molybdenum was recovered.

EXAMPLE 4

Another concentrated 5 gram spent catalyst sample in the form of a powder which contained 13% by weight molybdenum was given three successive treatments for two hours with concentrated ammonium hydroxide (29%). The weight ratio of aqueous extractant to spent catalyst was 10:1. Eighty-three percent of the molybdenum was recovered in the aqueous ammoniacal extracts.

EXAMPLE 5

The spent catalyst sample described in Example 4 was treated first with ammonium hydroxide and then with concentrated nitric acid. The sample was added slowly to the acid to prevent the mixture from heating too rapidly. The ratio of the combined weight of base and acid to spent catalyst weight was about 15:1. The mixture was stirred for two hours at ambient temperature. The total amount of molybdenum recovered was 75%.

EXAMPLE 6

The spent catalyst described in Example 4 was treated with 5% ammonium hydroxide solution at ambient temperature for one hour. The weight to weight ratio of extractant to solid catalyst residue was 2.5:1. Twenty-eight percent of the molybdenum was recovered in the filtrate. The filtrate was acidified to a pH of 1.5 with $HNO_3$. The precipitate formed contained a molybdenum content of 60.4% which represents a 90% recovery of the molybdenum in the extract solution.

While it will be apparent that the invention herein disclosed is well calculated to fulfill the objects and advantages hereinbefore set forth, it will be appreciated that the invention is susceptible to modification, variation and change without departing from the spirit thereof.

What is claimed is:

1. The method of recovering molybdenum from organic spent catalyst solutions derived from epoxidation of olefinically unsaturated compounds and like processes which comprises the steps of subjecting the molybdenum containing organic solution to plural liquid-to-liquid extraction cycles each comprising intimately mixing said organic solution with an aqueous extractant for a period of time sufficient to effect an extraction and transfer of at least a portion of the dissolved molybdenum from said organic solution to dissolved molybdenum in said aqueous extractant and thereafter permitting said mixture to settle into two phases and separating the organic solution phase from the aqueous extractant phase, the volumetric ratio of said organic solution to said aqueous extractant being greater than 1:1 for each extraction cycle, removing the extracted dissolved molybdenum constituent from said aqueous extractant producing a substantially non-volatile molybdenum containing residue, calcining said molybdenum containing residue at an elevated temperature in air to form a solid residue containing molybdenum oxide, and thereafter recovering said molybdenum oxide from said solid residue.

2. The method as defined in claim 1, wherein said extracted soluble molybdenum constituent is removed from said aqueous extractant by evaporating water from said aqueous extractant to form said non-volatile residue.

3. The method as defined in claim 1, wherein said aqueous extractant contains ammonium hydroxide for effecting a reaction with said molybdenum constituent to form aqueous soluble molybdenum compounds, and including the further step of acidifying the said aqueous extractant containing the extracted said molybdenum constituent and effecting a separation thereof from said aqueous extractant by precipitating the ammonium molybdenum compounds in the form of said substantially non-volatile solid residue.

4. The method as defined in claim 1, wherein said organic spent catalyst solution comprises an organic solution containing from about 0.2% to about 0.8% by weight of said molybdenum constituent calculated as metallic molybdenum.

5. The method as defined in claim 1, in which said aqueous extractant consists essentially of water.

6. The method as defined in claim 1, in which said organic solution is subjected to a plurality of said extraction cycles in which the volumetric ratio of organic solution to aqueous extractant is controlled at about 4:1 for the first cycle, about 10:1 during the second cycle and about 20:1 during the third cycle.

7. The method as defined in claim 1, wherein said organic solution is subjected to a plurality of said extraction cycles to effect an extraction of at least about 90% of the molybdenum constituents from said organic spent catalyst residues.

8. The method as defined in claim 1, wherein said organic spent catalyst solution comprises a concentrate of an organic spent catalyst solution derived from the liquid phase molybdenum catalyzed epoxidation of olefinically unsaturated compounds in the presence of organic hydroperoxides.

9. The method as defined in claim 1, including the further step of concentrating said organic spent catalyst solution by removing organic solvent to produce a concentrated residue ranging from a viscous liquid to a waxy-like solid and containing from about 2% up to about 7% by weight molybdenum calculated as metallic molybdenum.

10. The method as defined in claim 9, including the further step of diluting said concentrated residue prior to liquid-to-liquid extraction by adding organic solvent thereto to provide a spent catalyst solution containing from about 0.2% to about 0.8% by weight molybdenum.

11. The method as defined in claim 9, in which said aqueous extractant comprises an aqueous solution containing a reagent selected from the group consisting of potassium hydroxide, sodium hydroxide, ammonium hydroxide, nitric acid, phosphoric acid and hydrochloric acid.

12. The method as defined in claim 9, in which said aqueous extractant comprises an aqueous solution containing ammonium hydroxide in an amount of from about 10% up to about 30% by weight.

13. The method as defined in claim 9, wherein said residue comprises a substantially solid black powdered concentrate containing up to about 13% molybdenum constituents therein and wherein said aqueous extractant comprises an aqueous solution containing a reagent selected from the group consisting of from about 2% to about 10% potassium hydroxide, from about 2% to about 10% sodium hydroxide, from about 10% to about 30% ammonium hydroxide, concentrated nitric acid, from about 10% to about 75% phosphoric acid and concentrated hydrochloric acid.

14. The method as defined in claim 9, wherein said aqueous extractant comprises an aqueous solution containing from about 10% to about 30% ammonium hydroxide for reacting with said molybdenum constituent to form aqueous soluble ammonium-molybdenum compounds, and wherein the extracted aqueous soluble said ammonium-molybdenum compounds are separated from said aqueous extractant by precipitation in response to an acidification of said aqueous extractant to a pH of less than about 2.

15. The method as defined in claim 14, wherein said acidification is performed employing nitric acid.

16. The method as defined in claim 15, including the further steps of separating the precipitated said ammonium-molybdenum compounds by filtration and thereafter calcining the precipitate at an elevated temperature in air to form a molybdenum oxide product.

References Cited

UNITED STATES PATENTS

| | | | |
|---|---|---|---|
| 3,463,604 | 8/1969 | Tave | 423—56 |
| 3,567,433 | 3/1971 | Gutnikov | 423—606 |
| 3,539,290 | 11/1970 | Erickson et al. | 423—53 |

FOREIGN PATENTS

| | | | |
|---|---|---|---|
| 459,554 | 1/1937 | Great Britain | 423—53 |

HERBERT T. CARTER, Primary Examiner